(12) United States Patent
Bischofberger

(10) Patent No.: US 10,731,599 B2
(45) Date of Patent: *Aug. 4, 2020

(54) PISTON FOR AN INTERNAL COMBUSTION ENGINE AND METHOD FOR PRODUCING SAME

(75) Inventor: Ulrich Bischofberger, Esslingen (DE)

(73) Assignee: MAHLE INTERNATIONAL GMBH, Stuttgart (DE)

(*) Notice: Subject to any disclaimer, the term of this patent is extended or adjusted under 35 U.S.C. 154(b) by 793 days.

This patent is subject to a terminal disclaimer.

(21) Appl. No.: 14/345,682

(22) PCT Filed: Sep. 14, 2012

(86) PCT No.: PCT/DE2012/000919
§ 371 (c)(1),
(2), (4) Date: Sep. 19, 2014

(87) PCT Pub. No.: WO2013/041076
PCT Pub. Date: Mar. 28, 2013

(65) Prior Publication Data
US 2015/0075455 A1    Mar. 19, 2015

(30) Foreign Application Priority Data
Sep. 20, 2011   (DE) .................... 10 2011 113 800

(51) Int. Cl.
*F02F 3/22* (2006.01)
*F02F 3/18* (2006.01)
(Continued)

(52) U.S. Cl.
CPC ............. *F02F 3/22* (2013.01); *F02F 3/0084* (2013.01); *F02F 3/18* (2013.01); *F16J 1/08* (2013.01)

(58) Field of Classification Search
CPC ....... F02F 3/16–225; F02F 2200/06–11; F01P 2009/005; F01P 9/00; F01P 3/06; F01P 3/10; F01P 1/04; F16J 1/08; F16J 1/09
(Continued)

(56) References Cited

U.S. PATENT DOCUMENTS 1,841,796 A    1/1932  Edwards
1,878,566 A *  9/1932  Woolson ................... F02F 3/18
                                                        123/41.16
(Continued)

FOREIGN PATENT DOCUMENTS

CN    1438413 A    8/2003
CN    1957163 A    5/2007
(Continued)

OTHER PUBLICATIONS

Cverna, Fran. (2002). ASM Ready Reference—Thermal Properties of Metals—Table 5.2 Melting Point for Pure Metals and Eutectic Alloys. ASM International. Online version available at: http://app.knovel.com/hotlink/pdf/id:kt00URN693/asm-ready-reference-thermal/melting-point-pure-metals.*
(Continued)

*Primary Examiner* — Jacob M Amick
*Assistant Examiner* — Michael A Kessler
(74) *Attorney, Agent, or Firm* — Collard & Roe, PC

(57) ABSTRACT

A piston for an internal combustion engine has a piston head and a piston skirt. The piston head has a circumferential ring part and a circumferential cooling channel in the region of the ring part. The piston skirt has piston bosses with boss bores and which are arranged on the lower face of the piston head via boss connections. The piston bosses are connected to one another via running surfaces. At least one bore is provided which is closed towards the outside and which is arranged between a running surface and a boss bore. The at
(Continued)

Figure 1:
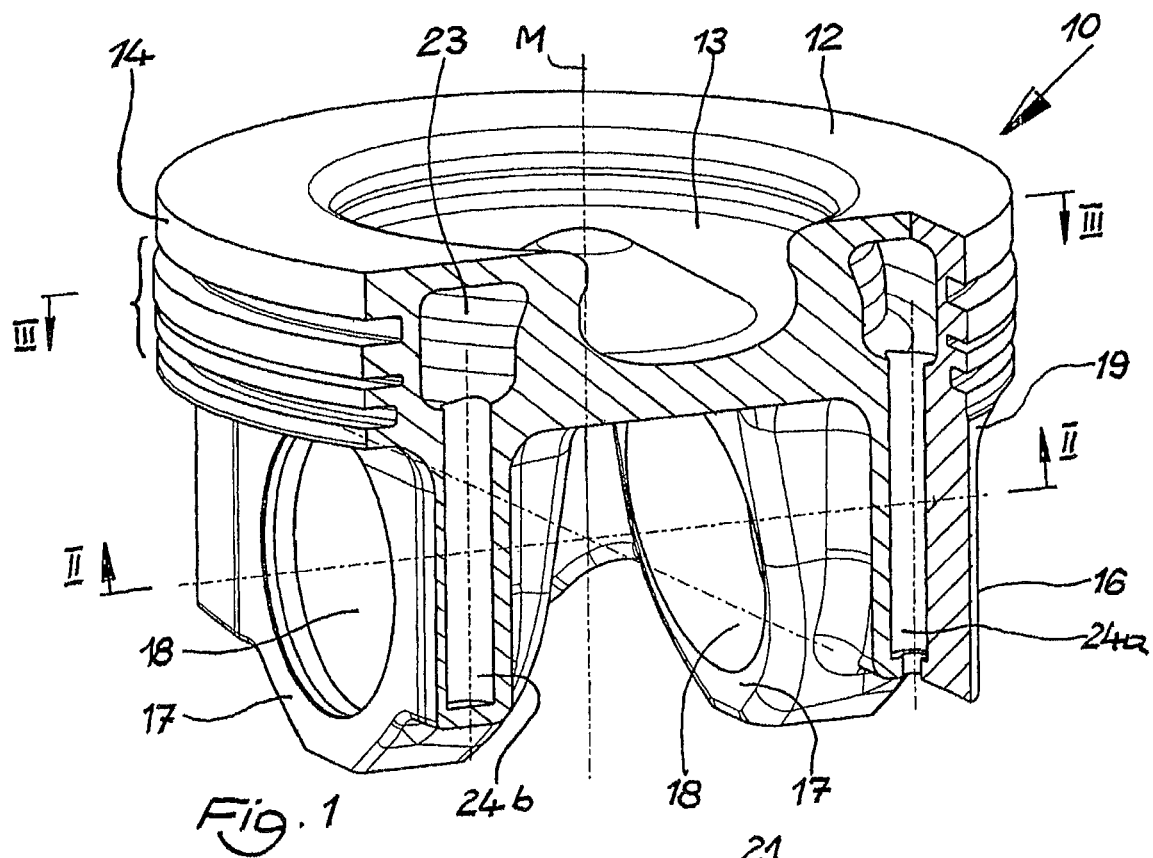

least one bore opens into the cooling channel, and the cooling channel and the at least one bore contain a coolant in the form of a low-melting metal or a low-melting metal alloy.

10 Claims, 2 Drawing Sheets

(51) Int. Cl.
*F16J 1/08* (2006.01)
*F02F 3/00* (2006.01)

(58) Field of Classification Search
USPC .......... 123/41.01, 41.17, 193.6, 41.34, 41.35
See application file for complete search history.

(56) References Cited

U.S. PATENT DOCUMENTS

| | | | |
|---|---|---|---|
| 1,953,109 A | 4/1934 | Heron | |
| 4,206,726 A * | 6/1980 | Johnson, Jr. | F01P 3/08 123/41.35 |
| 4,428,330 A * | 1/1984 | Shimizu | F02F 3/22 123/41.35 |
| 4,493,292 A | 1/1985 | Showalter | |
| 4,892,069 A * | 1/1990 | Rosch | F02F 3/18 123/193.3 |
| 5,778,533 A * | 7/1998 | Kemnitz | B23P 15/10 123/193.6 |
| 6,032,619 A * | 3/2000 | Zhu | F02F 3/003 123/41.35 |
| 6,487,773 B1 | 12/2002 | Scharp et al. | |
| 6,698,391 B1 * | 3/2004 | Kemnitz | F02F 3/003 123/193.6 |
| 6,763,758 B2 * | 7/2004 | Kemnitz | F02F 3/22 92/186 |
| 6,892,690 B2 | 5/2005 | Gabriel et al. | |
| 6,904,876 B1 | 6/2005 | Hofbauer et al. | |
| 8,087,395 B2 * | 1/2012 | Scharp | F02F 3/22 123/193.6 |
| 8,789,273 B2 | 7/2014 | Janssen et al. | |
| 8,899,208 B2 * | 12/2014 | Bischofberger | F02F 3/18 123/193.6 |
| 8,950,375 B2 | 2/2015 | Grahle et al. | |
| 9,228,530 B2 | 1/2016 | Kodama et al. | |
| 2005/0087153 A1 * | 4/2005 | Moon | F28D 15/00 123/41.35 |
| 2010/0050861 A1 * | 3/2010 | Azevedo | F02F 3/24 92/158 |
| 2012/0000439 A1 * | 1/2012 | Scharp | F02F 3/003 123/193.6 |
| 2013/0047948 A1 | 2/2013 | Heuschmann | |

FOREIGN PATENT DOCUMENTS

| | | | |
|---|---|---|---|
| DE | 726 685 C | 10/1942 | |
| DE | 762 820 C | 11/1952 | |
| DE | 26 13 059 A1 | 6/1977 | |
| DE | 85 01 763 U1 | 12/1987 | |
| DE | 100 36 481 A1 | 2/2002 | |
| DE | 602 04 296 T2 | 4/2006 | |
| FR | 2 901 577 A3 | 11/2007 | |
| GB | 396 249 A | 8/1933 | |
| GB | 517 713 A | 2/1940 | |
| GB | 670525 A * | 4/1952 | ............ F02F 3/0023 |
| IT | 1 057 365 B | 3/1982 | |
| JP | S52-66126 A | 6/1977 | |
| JP | S60-45756 A | 3/1985 | |
| JP | S62-96762 A | 5/1987 | |
| JP | H04-13686 A | 1/1992 | |
| JP | H04-265451 A | 9/1992 | |
| JP | H05-66247 U | 9/1993 | |
| JP | H06-49745 A | 2/1994 | |
| JP | 2005-127300 A | 5/2005 | |
| JP | 2006-075756 A | 3/2006 | |
| JP | 2006-299979 A | 11/2006 | |
| JP | 2007-507652 A | 3/2007 | |
| JP | 2007-100612 A | 4/2007 | |
| JP | WO 2007063899 A1 * | 6/2007 | ................ F02F 3/22 |
| JP | 2009-114981 A | 5/2009 | |
| JP | 2011-506830 A | 3/2011 | |
| JP | 2011-514258 A | 5/2011 | |
| JP | 2011-153602 A | 8/2011 | |
| JP | 2014-525536 A | 9/2014 | |
| JP | 2014-185522 A | 10/2014 | |

OTHER PUBLICATIONS

International Search Report of PCT/DE2012/000919, dated Dec. 21, 2012.
German Search Report dated Aug. 3, 2012 in German Application No. 10 2011 113 800.9 with English translation of relevant parts.
Chinese Office Action in CN 201280051000.3 dated Sep. 25, 2015 in English.
European Office Action in EP 12778204.3 dated Mar. 4, 2016, with English translation of relevant parts.
Japanese Office Action in JP 2014-531101 dated Apr. 22, 2016, with English translation of relevant parts.
Japanese Notice of Allowance in JP 2014-531101 dated Jan. 16, 2017, with English translation of relevant parts.

* cited by examiner

PISTON FOR AN INTERNAL COMBUSTION ENGINE AND METHOD FOR PRODUCING SAME

CROSS REFERENCE TO RELATED APPLICATIONS

This application is the National Stage of PCT/DE2012/000919 filed on Sep. 14, 2012 which claims priority under 35 U.S.C. § 119 of German Application No. 10 2011 113 800.9 filed on Sep. 20, 2011, the disclosure of which is incorporated by reference. The international application under PCT article 21(2) was not published in English.

The present invention relates to a piston for an internal combustion engine, having a piston head and a piston skirt, wherein the piston head has a circumferential ring belt and a circumferential cooling channel in the region of the ring belt, wherein the piston skirt has pin bosses provided with pin bores, which pin bosses are disposed on the underside of the piston head by way of pin boss connections, wherein the pin bosses are connected with one another by way of working surfaces.

In modern internal combustion engines, the pistons are exposed to higher and higher temperature stresses in the region of the piston crowns. This leads to significant temperature differences, in operation, between the piston head and the piston skirt. Therefore the installation play of the pistons in a cold engine is also different from the installation play in a warm engine.

The task of the present invention consists in further developing a piston of the stated type in such a manner that a more uniform temperature distribution between the piston head and the piston skirt occurs during operation.

The solution consists in that at least one bore closed to the outside is provided, which bore is disposed between a working surface and a pin bore, that the at least one bore opens into the cooling channel, that the cooling channel and the at least one bore contain a coolant in the form of a metal having a low melting point or a metal alloy having a low melting point.

The piston according to the invention is characterized in that the heat generated in the region of the piston crown is passed into the piston by way of the piston head, and given off by way of the comparatively large-area working surfaces. In this way, a more uniform heat distribution over the entire piston is achieved during operation. Furthermore, more effective cooling of the entire piston is achieved.

If, in addition, the underside of the piston head is cooled with cooling oil, the formation of oil carbon is avoided. In total, the cooling oil consumption is furthermore reduced.

Additional thermal expansion of the piston skirt is brought about by means of the additional heating of the region between pin boss and piston skirt, and thereby the heat play between piston and cylinder is reduced. This is particularly advantageous if a crankcase composed of a light metal material, for example an aluminum-based material, having a higher heat expansion coefficient than that of the piston material, is used.

Advantageous further developments are evident from the dependent claims.

Metals having a low melting point, which are suitable for use as a coolant, are, in particular, sodium or potassium. Galinstan® alloys, bismuth alloys having a low melting point, and sodium/potassium alloys can particularly be used as metal alloys having a low melting point.

Alloy systems composed of gallium, indium, and tin are referred to as what are called Galinstan® alloys, which are liquid at room temperature. These alloys consist of 65 wt.-% to 95 wt.-% gallium, 5 wt.-% to 26 wt.-% indium, and 0 wt.-% to 16 wt.-% tin. Preferred alloys are those, for example, with 68 wt.-% to 69 wt.-% gallium, 21 wt.-% to 22 wt.-% indium, and 9.5 wt.-% to 10.5 wt.-% tin (melting point −19° C.), 62 wt.-% gallium, 22 wt.-% indium, and 16 wt.-% tin (melting point 10.7° C.), and 59.6 wt.-% gallium, 26 wt.-% indium, and 14.4 wt.-% tin (ternary eutectic, melting point 11° C.).

Bismuth alloys having a low melting point are known in great numbers. These include, for example, LBE (eutectic bismuth/lead alloy, melting point 124° C.), Rose's metal (50 wt.-% bismuth, 28 wt.-% lead, and 22 wt.-% tin, melting point 98° C.), Orion metal (42 wt.-% bismuth, 42 wt.-% lead, and 16 wt.-% tin, melting point 108° C.); quick solder (52 wt.-% bismuth, 32 wt.-% lead, and 16 wt.-% tin, melting point 96° C.), Darcet's metal (50 wt.-% bismuth, 25 wt.-% lead, and 25 wt.-% tin), Wood's metal (50 wt.-% bismuth, 25 wt.-% lead, 12.5 wt.-% tin, and 12.5 wt.-% cadmium, melting point 71° C.), Lipowitz' metal (50 wt.-% bismuth, 27 wt.-% lead, 13 wt.-% tin, and 10 wt.-% cadmium, melting point 70° C.), Harper's metal (44 wt.-% bismuth, 25 wt.-% lead, 25 wt.-% tin, and 6 wt.-% cadmium, melting point 75° C.), Cerrolow 117 (44.7 wt.-% bismuth, 22.6 wt.-% lead, 19.1 wt.-% indium, 8.3 wt.-% tin, and 5.3 wt.-% cadmium, melting point 47° C.), Cerrolow 174 (57 wt.-% bismuth, 26 wt.-% indium, 17 wt.-% tin, melting point 78.9° C.), Field's metal (32 wt.-% bismuth, 51 wt.-% indium, 17 wt.-% tin, melting point 62° C.), and Walker's alloy (45 wt.-% bismuth, 28 wt.-% lead, 22 wt.-% tin, and 5 wt.-% antimony).

Suitable sodium/potassium alloys can contain 40 wt.-% to 90 wt.-% potassium. The eutectic alloy NaK with 78 wt.-% potassium and 22 wt.-% sodium (melting point −12.6° C.) is particularly suitable.

The coolant can additionally contain lithium and/or lithium nitride. If nitrogen is used as a protective gas during filling, this can react with the lithium to form lithium nitride and can be removed from the cooling channel in this manner.

The coolant can furthermore contain sodium oxides and/or potassium oxides, if dry air that might be present during filling has reacted with the coolant.

Preferably, four bores are provided, which are disposed between a working surface and a pin bore, in order to achieve a particularly uniform temperature distribution in the piston.

It is practical if the at least one bore is closed off by means of a closure element that is pressed into the bore, for example, or welded to the bore, in order to prevent coolant from exiting.

The amount of the coolant accommodated in the cooling channel or in the at least one bore depends on its heat conductivity and the degree of the desired temperature control. Preferably, the coolant has a fill height up to half the height of the cooling channel, in order to achieve a Shaker effect and thereby particularly effective heat distribution in the piston.

Particularly if the proportion of combustion heat that flows off into the piston during engine operation is to be limited, this can be controlled with the amount of coolant filled in. It has been shown that sometimes, filling 3% to 5% of the cooling channel volume with the coolant is sufficient to ensure proper functioning of the piston.

The piston according to the invention preferably consists essentially of an iron-based material, for example a material from the group comprising precipitation-hardening steels, tempered steels, high-strength cast iron, and cast iron with lamellar graphite.

Figure 2:
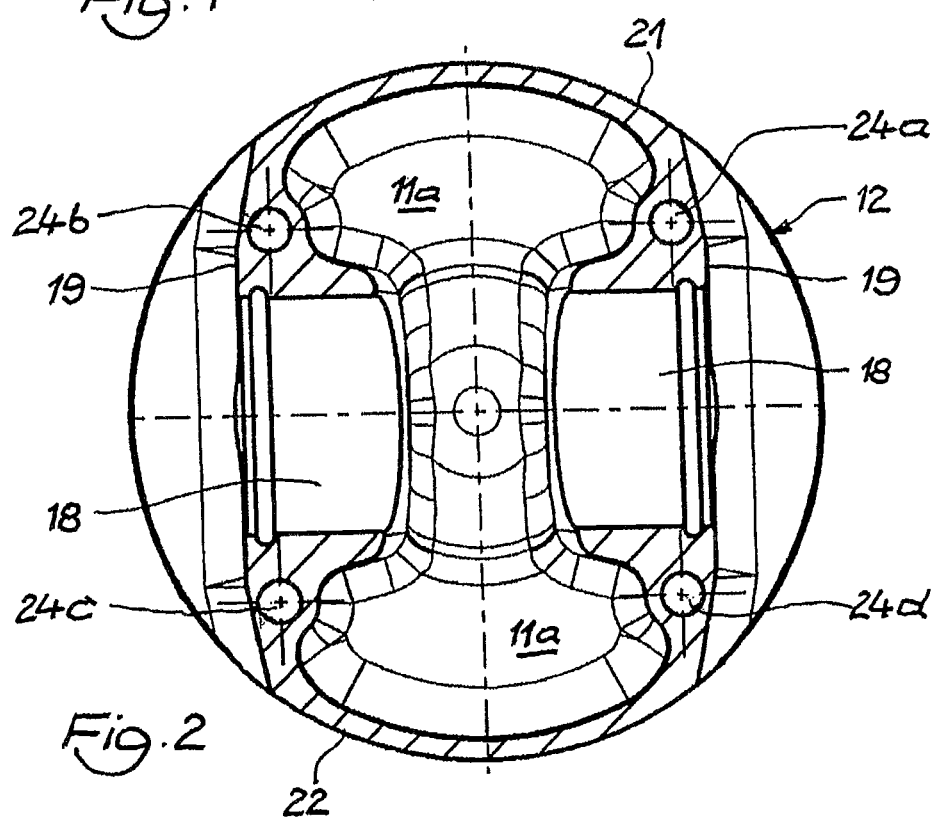
Figure 3:
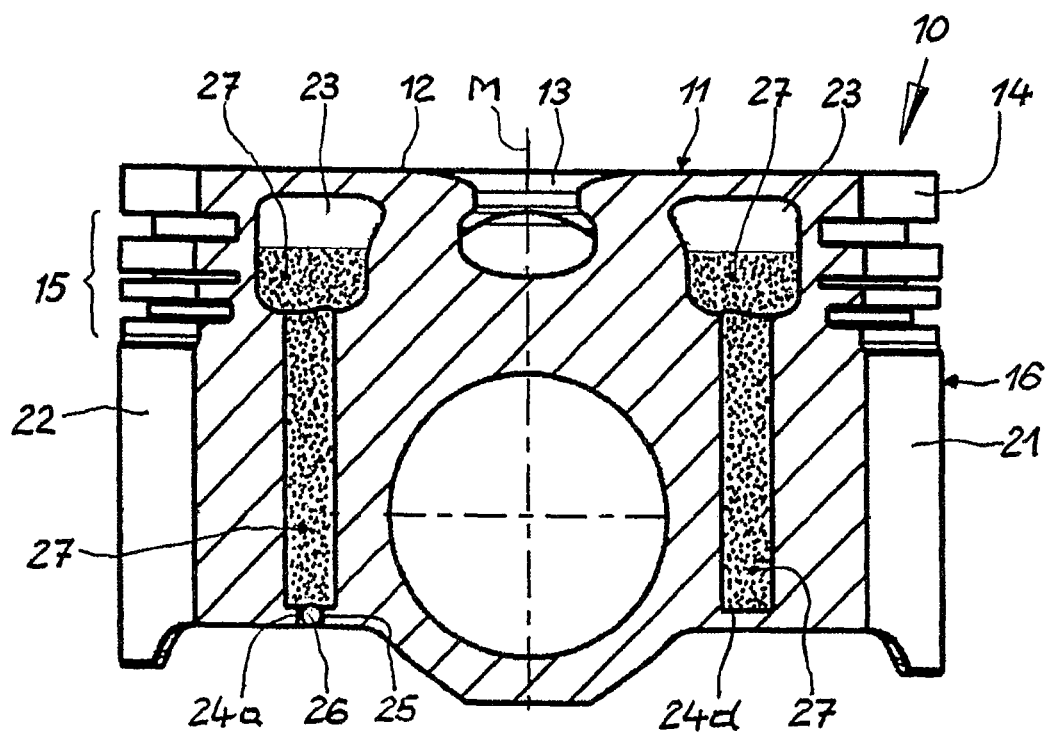
Figure 4:
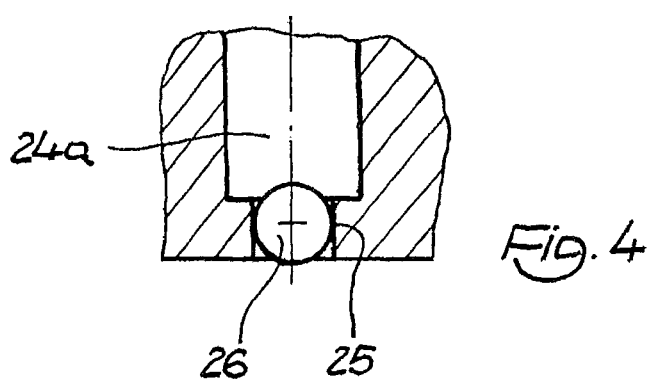

An exemplary embodiment of the present invention will be explained in greater detail below, using the attached drawings. These show, in a schematic representation, not true to scale:

FIG. 1 an exemplary embodiment of a piston according to the invention, partly in section;

FIG. 2 a section along the line II-II in FIG. 1;

FIG. 3 a section along the line III-III in FIG. 1;

FIG. 4 an enlarged partial representation from FIG. 3.

FIGS. 1 to 4 show an exemplary embodiment of a piston 10 according to the invention. The piston 10 can be a one-part or multi-part piston. The piston 10 can be produced from an iron-based material and/or a light metal material, whereby the iron-based material is preferred.

FIGS. 1 to 3 show, as examples, a one-part box piston 10. The piston 10 has a piston head 11 having a piston crown 12 that has a combustion bowl 13, having a circumferential top land 14, and having a ring belt 15 for accommodating piston rings (not shown). A circumferential cooling channel 23 is provided at the level of the ring belt 15. The piston 10 furthermore has a piston skirt 16 having pin bosses 17 and pin bores 18 for accommodating a piston pin (not shown). The pin bosses 17 are connected with the underside 11a of the piston head by way of pin boss connections 19. The pin bosses 17 are connected with one another by way of working surfaces 21, 22 (see, in particular, FIG. 2).

In the exemplary embodiment, the piston skirt 16 has four bores 24a, 24b, 24c, 24d. In the exemplary embodiment, the bores 24a-d run approximately axially and parallel to the piston center axis M. However, the bores 24a-d can also run slanted, at an angle to the piston center axis M. The bores 24a-d are disposed between a working surface 21, 22 and a pin bore 18. The bores 24a-d open into the cooling channel 23.

In the exemplary embodiment, the piston 10 can be cast, in known manner, for example, whereby the cooling channel 23 and the bores 24a-d can be introduced in known manner, by means of a salt core. It is essential that at least one bore 24a has an opening 25 to the outside. According to the invention, the coolant 27, namely a metal having a low melting point or a metal alloy having a low melting point, as listed above as examples, is filled into the bore 24a through the opening 25. From there, the coolant 27 is distributed in the cooling channel 23 and in the further bores 24b-d. The opening 25 is subsequently closed off tightly, in the exemplary embodiment by means of a steel ball 26 that is pressed in. The opening 25 can also be closed off by means of welding on a lid or pressing in a cap, for example (not shown).

The size of the bores 24a-d and the fill amount of the coolant 27 are based on the size and the material of the piston 10. On average, about 10 g to 40 g coolant 27 are needed per piston 10. The cooling output can be controlled by way of the amount of coolant 27 added, taking its heat conductivity coefficient into consideration. For example, a fill level in the cooling channel 23 that corresponds to about half the height of the cooling channel 23 is suitable. In this case, the known Shaker effect can be additionally used for particularly effective heat distribution in the piston during operation. For sodium as the coolant 27, with a temperature in operation of 220° C., a maximal surface temperature of the piston 10 of about 260° C. occurs at a cooling output of 350 kW/m$^2$.

In addition, the underside 11a of the piston head 11 can be cooled by spraying it with cooling oil.

To fill the bore 24a, a lance is introduced through the opening 25, and flushed by means of nitrogen or by means of another suitable inert gas or by means of dry air. To introduce the coolant 27, the latter is passed through the opening 25 under protective gas (for example nitrogen, inert gas or dry air), so that the coolant 27 is accommodated in the bore 24a or the cooling channel 23.

A further method for filling the bore 24a is characterized in that after flushing with nitrogen, inert gas or dry air, the bores 24a-d and the cooling channel 23 are evacuated, and the coolant 27 is introduced in a vacuum. In this way, the coolant 27 can move back and forth in the cooling channel 23 more easily and can move into and out of the bores 24a-d more easily, because it is not hindered by protective gas that is present.

Another possibility of removing the protective gas from the cooling channel 23 or the bores 24a-d consists of using nitrogen or dry air (i.e. essentially a mixture of nitrogen and oxygen) as the protective gas, and adding a small amount of lithium to the coolant 27, empirically about 1.8 mg to 2.0 mg lithium per cubic centimeter gas space (i.e. volume of the cooling channel 23 plus volume of the bores 24a-d). While sodium and potassium, for example, react with oxygen to form oxides, the lithium reacts with nitrogen to form lithium nitride. The protective gas is therefore practically completely bound in the coolant 27 as a solid.

The invention claimed is:

1. A one-piece box-type piston for an internal combustion engine, comprising:
   a piston head having a circumferential ring belt and a circumferential cooling channel in a region of the ring belt,
   a piston skirt having two working surfaces in the form of skirt walls separated by pin boss connections in the form of planar box walls that connect the skirt walls, the box walls being located set inwardly toward a center of the piston with respect to the ring belt, pin bosses provided with pin bores, which pin bosses are disposed on an underside of the piston head by way of the box walls,
   wherein there are exactly four bores disposed between the working surfaces and the pin bores, each one of said exactly four bores being disposed within a corresponding box wall segment, each of said bores having one end opening into the cooling channel and another end being closed within the piston, the one end opening into the cooling channel being disposed at a height that is lower than an axial height of a topmost ring groove, and each of the bores extending from the cooling channel away from the piston crown to a point below an axial height of the pin bore zenith, wherein the cooling channel and the bores contain a coolant in the form of a metal having a low melting point or a metal alloy having a low melting point, and wherein at least one of the bores has an opening to the outside which is closed with a closure element such that coolant introduced through the opening prior to closure with the closure element is distributed to and retained in the cooling channel and remaining bores.

2. The piston according to claim 1, wherein sodium or potassium is contained as a metal having a low melting point.

3. The piston according to claim 1, wherein the metal alloy having a low melting point is selected from the group comprising eutectic alloys of gallium, indium and tin, bismuth alloys having a low melting point, and sodium/potassium alloys.

4. The piston according to claim 1, wherein the coolant contains lithium and/or lithium nitride.

5. The piston according to claim 1, wherein the coolant contains sodium oxides and/or potassium oxides.

6. The piston according to claim 1, wherein the closure element is pressed into the bore or welded to the piston.

7. The piston according to claim 1, wherein the coolant has a fill height up to half the height of the cooling channel.

8. The piston according to claim 1, wherein the coolant has a fill amount of 3% to 5% of the volume of the cooling channel.

9. The piston according to claim 1, wherein the piston consists of an iron-based material.

10. The piston according to claim 9, wherein the iron-based material is selected from the group consisting of precipitation-hardening steels, tempered steels, high-strength cast iron, and cast iron with lamellar graphite.

\* \* \* \* \*